US008533559B2

(12) United States Patent
Ootsuka

(10) Patent No.: US 8,533,559 B2
(45) Date of Patent: Sep. 10, 2013

(54) SEMICONDUCTOR RECORDING DEVICE WITH ERROR RECOVERY

(75) Inventor: Takeshi Ootsuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 12/988,660

(22) PCT Filed: Apr. 20, 2009

(86) PCT No.: PCT/JP2009/001791
§ 371 (c)(1),
(2), (4) Date: Oct. 20, 2010

(87) PCT Pub. No.: WO2009/139115
PCT Pub. Date: Nov. 19, 2009

(65) Prior Publication Data
US 2011/0041036 A1   Feb. 17, 2011

(30) Foreign Application Priority Data

May 12, 2008  (JP) ................................. 2008-124830

(51) Int. Cl.
*H03M 13/00*  (2006.01)
(52) U.S. Cl.
USPC ......................................................... 714/758
(58) Field of Classification Search
USPC ................ 714/6.2, 6.22, 6.24, 758, 763, 764, 714/766, 773; 711/100, 102–104, 114; 365/185.09, 185.33
See application file for complete search history.

(56) References Cited

U.S. PATENT DOCUMENTS

| 6,230,240 | B1 * | 5/2001 | Shrader et al. | 711/114 |
| 7,873,803 | B2 * | 1/2011 | Cheng | 711/161 |
| 7,890,795 | B1 * | 2/2011 | Madnani et al. | 714/6.2 |

(Continued)

FOREIGN PATENT DOCUMENTS

| JP | 2000-122811 | 4/2000 |
| JP | 2004-095145 | 3/2004 |
| JP | 2005-234883 A | 9/2005 |
| JP | 2006-318366 | 11/2006 |

OTHER PUBLICATIONS

International Search Report for corresponding International Application No. PCT/JP2009/001791 mailed Jul. 28, 2009.

(Continued)

*Primary Examiner* — Scott Baderman
*Assistant Examiner* — Joseph Kudirka
(74) *Attorney, Agent, or Firm* — Renner, Otto, Boisselle & Sklar, LLP

(57) ABSTRACT

An error correction code of (N+M) words is configured by adding an ECC parity of M word (M is a natural number) to N words extracted at an interval of A words with respect to data of (A*N) words (A and N are natural numbers) inputted via an interface. A data distributor distributes (N+M) words to the respective (N+M) physical blocks to record by A words. In a case where a writing error has occurred, data recorded in a cell sharing page of the page and in a page of another physical block configuring the error correction code is read. A disappearing correction is carried out to the data of the cell sharing page by using the data, and thus the data of the cell sharing page is recovered and written. In this manner, in the multi-level nonvolatile memory, an error in writing of a certain page can be prevented from propagating to a written page sharing a cell.

4 Claims, 10 Drawing Sheets

(56) References Cited

U.S. PATENT DOCUMENTS

| | | | |
|---|---|---|---|
| 8,041,989 B2* | 10/2011 | Lastras-Montano et al. | 714/6.2 |
| 8,200,887 B2* | 6/2012 | Bennett | 711/103 |
| 2005/0185476 A1 | 8/2005 | Tachikawa | |
| 2006/0123270 A1* | 6/2006 | Forhan et al. | 714/6 |
| 2008/0256292 A1* | 10/2008 | Flynn et al. | 711/114 |
| 2010/0199125 A1* | 8/2010 | Reche | 714/6 |

OTHER PUBLICATIONS

Form PCT/ISA/237 for corresponding International Application No. PCT/JP2009/001791 dated Jul. 28, 2009.

International Preliminary Report on Patentability (English translation) for corresponding International Application No. PCT/JP2009/001791 issued Dec. 13, 2010.

* cited by examiner

F I G. 3
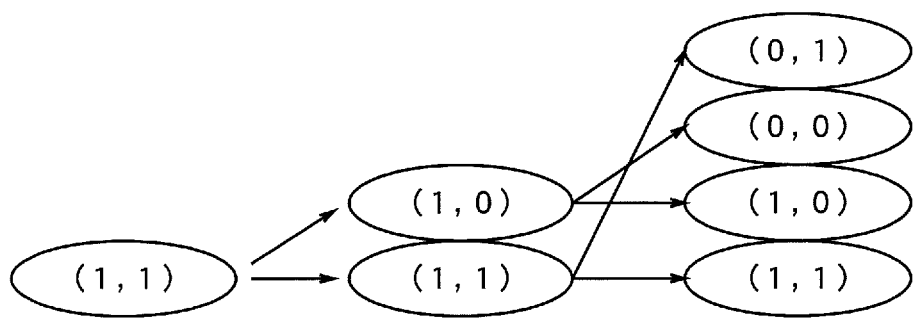

FIG. 5

| PN | PB0 | PB1 | PB2 | PB3 | PB4 |
|---|---|---|---|---|---|
| 0 | 0 | A | 2*A | 3*A | |
| 1 | 4*A | 5*A | 6*A | 7*A | |
| K−1 | (4*K−4)*A | (4*K−3)A | (4*K−2)*A | (4*K−1)*A | |
| K | (4*K)*A | (4*K+1)A | (4*K+2)*A | (4*K+3)*A | |
| K+1 | (4*K+4)*A | (4*K+5)A | (4*K+6)*A | (4*K+7)*A | |
| 2*K−1 | (8*K−4)*A | (8*K−3)A | (8*K−2)*A | (8*K−1)*A | |

SEMICONDUCTOR RECORDING DEVICE WITH ERROR RECOVERY

TECHNICAL FIELD

The present invention relates to a semiconductor recording device such as a memory card, and especially relates to a semiconductor recording device that recovers a writing error and reading error occurred in an internal nonvolatile memory.

BACKGROUND ART

In recent years, a semiconductor recording device such as a SD (Secure Digital) card that is a card-type recording medium incorporating a flash memory has been extremely-compact and extremely-thin, has been able to be easily handled, and accordingly has been widely used for recording data such as an image in a digital camera and portable apparatus.

The flash memory incorporated in the semiconductor recording device is composed of many physical blocks of a constant size, and is a memory able to erase data in units of physical block. To satisfy a recent request for enlargement of the capacity, a multi-level flash memory able to accumulate two bits or more in one cell is commercialized as the flash memory.

FIG. 1 shows an example of a relationship between the number of electrons accumulated in a floating gate of the multi-level flash memory and a threshold voltage (Vth). As shown in FIG. 1, in a four-valued flash memory, an accumulation state of the electrons in the floating gate is managed in four states in accordance with the threshold voltage (Vth). In an erased state, an electric potential is in a lowest level, which is shown as (1, 1). Then, as the electrons are accumulated, the threshold voltage discretely increases, and the states are shown as (1, 0), (0, 0), and (0, 1). In this manner, since the electric potential rises in proportion to the number of accumulated electrons, the recording of 2-bit data in one cell can be realized by controlling the electric potential so as to be within a predetermined threshold value.

FIG. 2 shows a schematic diagram of one physical block of the four-valued flash memory. The physical block shown in FIG. 2 is composed of 2*K pages (K is a natural number). And, a writing process is carried out in ascending order from page number 0. Here, it is assumed that a page of page number m (0<=m<K) and a page of page number (K+m) are in a relation of sharing one memory (hereinafter referred to as a cell sharing relation). In the pages being in the cell sharing relation, a firstly written page is referred to as a first page, and a subsequently written page is referred to as a second page. That is, the writing to the page number m (the writing to the first page) and the writing to the page number (K+m) (the writing to the second page) are the charging of electrons to a same cell. Explained referring to FIG. 1, in the writing to the first page, the electric potential is controlled so as to rise to a half level, and in the next writing to the second writing, the electric potential is controlled so as to rise to a maximum level. FIG. 3 shows a state transition of the flash memory cell. As shown in FIG. 3, the state of one memory cell of the physical block of the flash memory transits as follows.

(a) After erasing data, the state of memory cell is (1, 1).
(b) After the writing to the first page, the state of cell is (1, 1) or (1, 0).
(c) After the writing to the second page, the state of cell is (1, 1), (1, 0), (0, 0), or (0, 1).

As mentioned above, in the multi-level flash memory, a multi-level recording that provides a plurality of threshold values to Vth and controls an accumulation amount of electrons in the flash memory is carried out, and thereby realizing the enlargement of capacity.

The abovementioned states (b) and (c) will be explained in detail more. In (b), a state after writing "1" to a memory cell of the first page is (1, 1), and a state after writing "0" is (1, 0). Additionally, in (c), the transition is restricted depending on the state in (b). Specifically, the transition from the state of (1, 1) in (b) will be retained in the state of (1, 1) in the case of writing "1", and will be in (0, 1) in the case of writing "0". Meanwhile, the transition from the state of (1, 0) in (b) will be retained in the state of (1, 0) in the case of writing "1", and will be in (0, 0) in the case of writing "0".

However, in a process of the transition from (b) to (c), a problem that a writing error propagates to the already written first page will occur. That is, in carrying out the electron injection to set the memory cell being in (1, 1) in (b) to the state of (0, 1), the electric potential sometimes does not rise to the Vth corresponding to (0, 1) due to a life expiration of the cell to stop in midstream. When stopping at (1, 0) for example, the already written first page transits from "1" to "0". In this case, there has been not only the error of the second page but also a problem that the error propagates to the first page.

The writing of page 0 to page (K−1) shown in FIG. 2 is the writing to the first page, and the writing error of this case is the error where the Vth does not rise to (1, 0) from the state of (1, 1). In addition, the writing of page K to page (2K−1) shown in FIG. 2 is the writing to the second page, and the state of the Vth becomes (1, 1), (1, 0), (0, 0), and (0, 1). The writing error on this case includes the following two errors.

(Error 1) The Vth (1, 0) does not rise to (0, 0).
(Error 2) The Vth (1, 1) does not rise to (0, 1).

In the case of error 1, the Vth (1, 0) is adjacent to the Vth (0, 0); however, the Vth (1, 1) and the Vth (0, 1) of the case of error 2 sandwich two states therebetween. In particular, the Vth (1, 0) is a value after the writing of the first page, and in a case where the Vth does not rise to over (1, 0) in the writing of the second page, not only the second page causes a writing error, but also data of the first page is destructed as a result. For example, the writing error that occurred in the writing of page K may destruct data already written to page 0.

To solve the problem, Patent document 1 includes a buffer memory in a memory controller for controlling the flash memory, stores data of the first page in the buffer memory until the writing of the second page completes, and in a case where a writing error has occurred in the writing of the second page, controls so as to load the data of the buffer memory and to also write the data of the first page to the flash memory again.

Patent document 1: Japanese Unexamined Patent Publication No. 2006-318366

DISCLOSURE OF INVENTION

Problem to be Solved by the Invention

However, in a conventional technique, data of the first page has to be retained in the buffer memory until the writing of the second page finishes. Accordingly, in a case of recording data partway in a certain physical block and subsequently writing to another physical block when information of the cell sharing relation is already known, the buffer memory needs to retain the data of the first pages of two physical blocks. For this reason, in the worst case, the buffer memory having a half capacity of the physical blocks that are in writing is required.

In addition, in a case where the information of the cell sharing page is not disclosed, the first page and the second page cannot be distinguished, and accordingly in a case where an error occurred in the writing to a certain page, it is required to write the data again to all the written pages of a physical block including the page. Accordingly, a large capacity buffer with approximately quadruple capacity of the physical block needs to be mounted inside a host apparatus or a memory card.

Moreover, in a case where the large capacity buffer cannot be mounted inside the memory card, a technique that limits, in units of physical block, a writing command issued from the host apparatus, and that in the case where an error occurred, the host apparatus writes the data again in units of physical block can be assumed. A size of the buffer memory in this case is suppressed to the physical block size. To realize the speeding up, in a case where the parallel writing is carried out, the size will be several times larger than the physical block size. However, the physical block size increases as the process becomes increasingly minute, and in this case, the buffer memory corresponding to the physical block size is also required. Additionally, there has been a problem that the already-known and commercialized host apparatus is not able to accept a new memory card.

The present invention solves the above-mentioned problem, and intends to provide a highly-reliable semiconductor recording device able to be compatible with a conventional host apparatus and also to read corrected data even in a case where a writing error occurred and a case where an error occurred after the writing.

Means to Solve the Problems

To solve the problems, a semiconductor recording device of the present invention incorporating a nonvolatile memory having physical blocks composed of a plurality of pages and configuring said N+M physical blocks as one group, comprises: a first ECC generator for adding an ECC parity of M words (M is a natural number) to N words extracted at an interval of A words in inputted data of (A*N) words (A and N are natural numbers) and generating A number of first ECC codes of (N+M) words; a data distributor for distributing words to (N+M) physical blocks by A words by repeating in each one word the distribution of (N+M) words of the first ECC code generated by said first ECC generator to different physical blocks in the group of the physical blocks of said nonvolatile memory; and a data writer for writing the data of A words per physical block distributed by said data distributor to the respective physical blocks of the group composed of N+M blocks of the nonvolatile memory.

Said data writer may writes the data of A words distributed by said data distributor to the same pages of the respective physical blocks.

The device may further comprise a writing error detector for detecting a writing error occurring in writing to said nonvolatile memory in units of page of the physical block; an error flag generator for generating an error flag showing possibility of the writing error with respect to a page of cell sharing in which the respective bits of a page where an error is detected by said writing error detector share a cell of said nonvolatile memory; a data reader for reading data of a page in which the error flag is generated by said error flag generator and all data configuring the first ECC code from the respective physical blocks; and a data recovering part for recovering data of a cell sharing page specified by said error flag generator from the data read by said data reader, wherein said data writer writes the data of the cell sharing page recovered by said data recovering part to a page of a physical block of said nonvolatile memory in which data is not written.

The device may further comprise: a writing error detector for detecting a writing error occurring in writing to said nonvolatile memory in units of page of the physical block; an error flag generator for generating an error flag showing possibility of the writing error with respect to all written page of the physical block to which a page where an error is detected by said writing error detector belongs; a data reader for sequentially reading data of a page in which the error flag is generated by said error flag generator and all data configuring the first ECC code from the respective physical blocks; and a data recovering part for recovering data of a page specified by said error flag generator from the data read by said data reader, wherein said data writer writes the data of the page recovered by said data recovering part to a page of a physical block of said nonvolatile memory in which data is not written.

Said (N+M) physical blocks may be different nonvolatile memories, respectively.

To solve the problems, a semiconductor recording device of the present invention incorporating a nonvolatile memory having physical blocks composed of a plurality of pages and configuring said N+M physical blocks as one group, comprises: a first ECC generator for adding an ECC parity of M words (M is a natural number) to N words extracted at an interval of A words in data of (A*N) words (A and N are natural numbers) inputted in writing of data and generating A number of first ECC codes of (N+M) words; a data distributor for distributing words to (N+M) physical blocks by A words by repeating in each one word the distribution of (N+M) words of the first ECC code generated by said first ECC generator to different physical blocks in the group of the physical blocks of said nonvolatile memory; a second ECC generator for generating a parity of B words (B is a natural number) with respect to A words distributed to the respective physical blocks from said data distributor; and a data writer for writing data of (A+B) words outputted from said second ECC generator to the respective pages of the respective physical blocks of a group composed of N+M blocks.

The device may further comprise: a writing error detector for detecting a writing error occurring in writing to said nonvolatile memory in units of page of the physical block; an error flag generator for generating an error flag showing possibility of the writing error with respect to a page of cell sharing in which the respective bits of a page where an error is detected by said writing error detector share a cell of said nonvolatile memory; a data reader for reading data of a page in which the error flag is generated by said error flag generator and all data configuring the first ECC code from the respective physical blocks; and a data recovering part for recovering data of a cell sharing page specified by said error flag generator from the data read by said data reader, wherein said data writer writes the data of the cell sharing page recovered by said data recovering part to a page of a physical block of said nonvolatile memory in which data is not written.

The device may further comprise: a writing error detector for detecting a writing error occurring in writing to said nonvolatile memory in units of page of the physical block; an error flag generator for generating an error flag showing possibility of the writing error with respect to all written page of the physical block to which a page where an error is detected by said writing error detector belongs; a data reader for sequentially reading data of a page in which the error flag is generated by said error flag generator and all data configuring the first ECC code from the respective physical blocks; and a data recovering part for recovering data of a page specified by said error flag generator from the data read by said data reader, wherein said data writer writes the data of the page recovered by said data recovering part to a page of a physical block of said nonvolatile memory in which data is not written.

The device may further comprise: a writing error detector for detecting a writing error occurring in writing to said nonvolatile memory in units of page of the physical block; a data reader for carrying out a reading operation to all written page of the physical block to which a page where an error is detected by said writing error detector belongs; a second ECC corrector for carrying out an error correction to data of (A+B) words read from said data reader and generating the reading error flag in a case where the correction could not be completed; and a data recovering part for carrying out a disappearing correction to data of the page specified by the reading error flag on the basis of data of the first ECC code having data of the page to which the reading error flag is added, the data being read by said data reader, as one of configuration elements, wherein said data writer writes the data of the page recovered by said data recovering part to a page of a physical block of said nonvolatile memory in which data is not written.

The device may further comprise: a data reader for reading data related to an address included in said reading command when receiving the reading command, and reading all data of said first ECC code having data of the page to which the reading error flag is added as configuration elements from the respective physical blocks of said nonvolatile memory; a second ECC corrector for carrying out an error correction to data of (A+B) words read from said data reader and generating the reading error flag in a case where the correction could not be completed; and a data recovering part for carrying out a disappearing correction to data of the page specified by the reading error flag on the basis of data of the first ECC code having data of the page to which the reading error flag is added, the data being read by said reader, as one of configuration elements, and outputting data related to the address included in said reading command and data recovered by said data recovering part.

To solve the problems, a semiconductor recording device of the present invention incorporating a nonvolatile memory having physical blocks composed of a plurality of pages, in which said N+M physical blocks is configured as one group, A number of first ECC codes of (N+M) words are generated in writing of data by adding an ECC parity of M word (M is a natural number) to N words extracted at an interval of A words with respect to data of (A*N) words (A and N are natural numbers), and the data configured as a second ECC code of (A+B) words by generating a parity of B (B is a natural number) words with respect to the A words is written to the same pages of the respective physical blocks of the group composed of N+M blocks, comprises: a data reader for reading data related to an address included in said reading command when receiving the reading command, and reading all data of said first ECC code using data of the page to which the reading error flag is added as configuration elements from the respective physical blocks of said nonvolatile memory; a second ECC corrector for carrying out an error correction to data of (A+B) words read from said data reader and generating the reading error flag in a case where the correction could not be completed; and a data recovering part for carrying out a disappearing correction to data of the page specified by the reading error flag on the basis of data of the first ECC code having data of the page to which the reading error flag is added, the data being read by said reader, as one of configuration elements, and outputting data related to the address included in said reading command and data recovered by said data recovering part.

Effectiveness of the Invention

According to the above-mentioned configuration, in a case where a writing error occurred in a second page, a disappearing correction is carried out by reading data of the first page sharing a memory cell of a nonvolatile memory storing the respective bits of the page and a page of another physical block configuring an error correction code together with said first page, and the writing is carried out again after recovering the data, and accordingly propagation of the writing error due to the cell sharing can be prevented without using a large capacity buffer memory.

In addition, also in the case where the information of the cell sharing in a physical block is not disclosed, all written pages of a physical block that occurred a writing error are regarded as being error, the data of a physical block configuring an error correction code together with the corresponding physical block is read in series, and the writing is carried out again carrying out the disappearing correction, and thereby all data can be recovered in units of physical block. Accordingly, the propagation of writing error due to the cell sharing, the propagation caused by the writing error, can be prevented, and a highly-reliable semiconductor recording device can be provided.

BRIEF DESCRIPTION OF DRAWINGS

FIG. 3 is a state transition view of a cell of the multi-level flash memory.

FIG. 5 is an explanation view of arrangement of data and parity of the physical block according to the present embodiment.

FIG. 8-1 is an explanatory diagram of a physical block in the state that the writing error occurred FIG. 8-2 is an explanatory diagram of a physical block for which the cell sharing in the occurrence of the writing error is taken into consideration (when the cell sharing relation is already known).

FIG. 8-3 is an explanatory diagram of a new physical block into which data is to be copied from the physical block in which the writing error occurred.

FIG. 9-1 is an explanatory diagram of a physical block in the state that the writing error occurred FIG. 9-2 is an explanatory diagram of a physical block for which the cell sharing in the occurrence of the writing error is taken into consideration (when the cell sharing relation is not known).

FIG. 9-3 is an explanatory diagram of a new physical block into which data is to be copied from the physical block in which the writing error occurred.

DESCRIPTION OF REFERENCE NUMERALS

Figure 1:
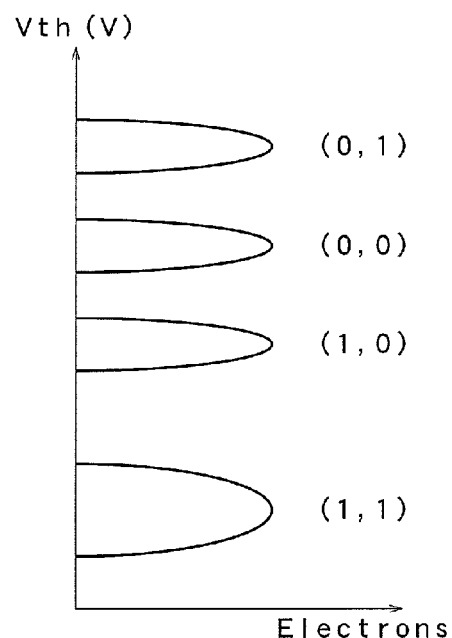
FIG. 1 is a schematic diagram showing an accumulation state of electrons of a multi-level flash memory.
Figure 2:
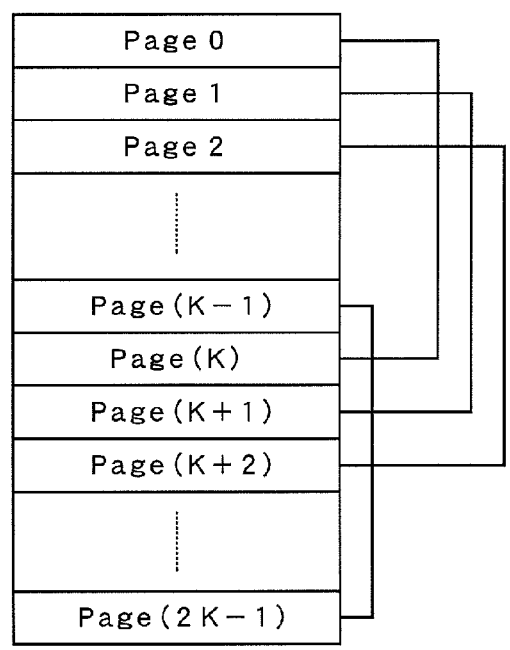
FIG. 2 is a diagram showing cell sharing of a physical block of the multi-level flash memory.

1 Interface
2 First ECC generator
3 Data distributor
5a to 5e Flash memory
6a to 6e Writing error detector
7 Flag generator
8a to 8e Data reader
9 Data recovering part
11a to 11e Second ECC generator
12a to 12e Data reader
13a to 13e second ECC corrector

BEST MODE FOR CARRYING OUT THE INVENTION

Embodiment 1

Figure 4:
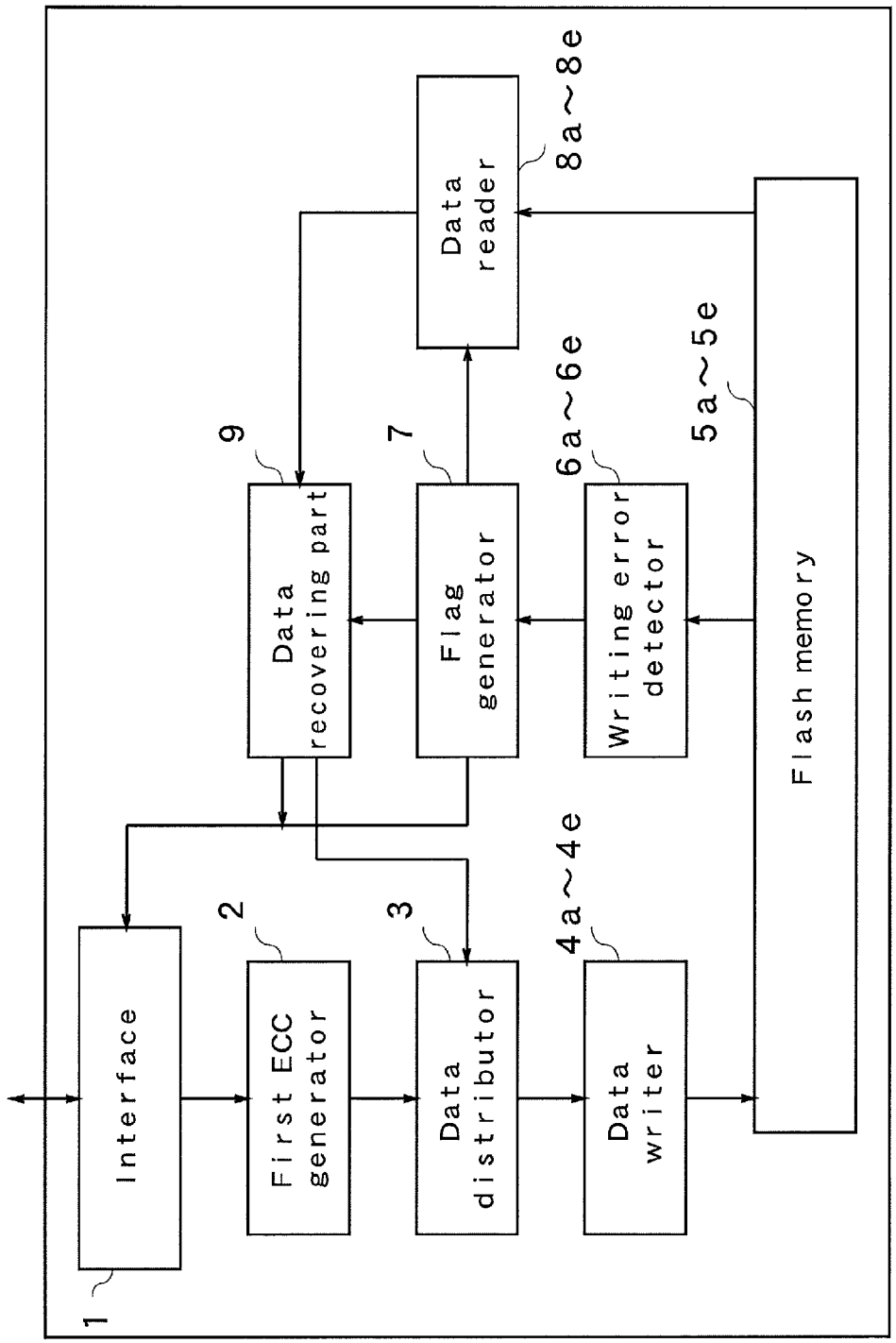
FIG. 4 is a configuration view of a semiconductor recording device according to embodiment 1 of the present invention.

FIG. 4 shows a configuration view of a semiconductor recording device according to embodiment 1 of the present invention. In the present embodiment, an interface 1 is an interface for receiving a command and data from a host apparatus not shown in the drawing and transferring the data.

When receiving a write command from the host apparatus, a first ECC generator 2 (hereinafter simply referred to as an ECC generator 2) adds an error correction parity to received writing data. In more detail, an ECC parity of M words (M is a natural number) is added to N words extracted at intervals of A words in the inputted data of (A*N) words (A and N are natural numbers) to generate A number of the first ECC codes of (N+M) words. Meanwhile, the ECC parity is a code having a function of error correction. Here, in the present embodiment, the explanation will be made assuming that N is four and M is one. In addition, ECC parity is generated to at least the data of a first page of a memory cell but may not be generated to the data of a second page.

A data distributor 3 distributes the ECC code to which the parity is added by the ECC generator 2 to the respective physical blocks of a flash memory. More specifically, (N+M) words of the ECC code generated by the ECC generator 2, five words here, are distributed to different physical blocks of the flash memory in each one word to distribute the code to (N+M) physical blocks by A words by repeating this process.

Data writers 4a to 4e record the data of A words per physical block distributed by the data distributor 3 to the physical blocks of the N+M groups of a nonvolatile memory. Here, since M+N is five, the data writers 4a to 4e, five, are mounted in parallel to write the data to one physical block of the respective five flash memories 5a to 5e, respectively.

The semiconductor recording device according to the present embodiment has (N+M), five here, flash memories 5a to 5e. The flash memories 5a to 5e are four-valued flash memories in the present embodiment. The respective flash memories have a plurality of physical blocks, respectively. Each of the physical blocks is an erasing unit, and has 2*K (K is a natural number) pages, respectively. Each page is composed of A (A is a natural number) words. Here, one word, for example, is one byte, that is, eight bits. The inside of the physical block of the flash memory is managed with page numbers from 0 to 2K−1 as shown in the above-mentioned FIG. 3. K pages of page numbers 0 to K−1 of them are configured by the first pages of memory cells, and K pages of page numbers K to 2K−1 are configured by the second pages of the memory cells.

The writing error detectors 6a to 6e detect a writing error generated when the writing is carried out to each of the flash memories 5a to 5e, respectively, and five detectors are mounted corresponding to the number of the flash memories.

The error flag generator 7 generates an error flag to the error detected by the writing error detectors 6a to 6e. The error flag generator 7 is assumed to know the cell sharing information of the flash memory, and, if an error of the second page, generates the error flag on the basis of the sharing information.

The data reader 8a to 8e reads data from the respective flash memories 5a to 5e corresponding to an address designated when a reading command is given from the host apparatus to the interface 1. In addition, when an error has occurred in data writing, the readers also read data in a case of correcting the error on the basis of the ECC code.

When an error has occurred in data writing, the data recovering part 9 carries out the error correction on the basis of data read via the data readers 8a to 8e and of the error flag generated by the error flag generator 7. And then, by copying data of an error-free page to a new physical block, the data is recovered in the new physical block. The recovered data is written back to any one of the flash memories 5a to 5e via the data distributor 3 and the data writers 4a to 4e.

Next, an operation of the semiconductor recording device of a case where the writing command and data are inputted via the interface 1 will be explained in detail below.

FIG. 5 is a diagram showing a relation between parallel physical blocks and the data and parity in a case where the striping recording is carried out to five flash memories 5a to 5e. In the drawing, a physical block PB0 is a physical block of the flash memory 5a, a physical block PB1 is a physical block of the flash memory 5b, and in the same manner, physical blocks PB2, PB3, and Pb4 are physical blocks of the flash memories 5c, 5d, and 5e, respectively. When a writing address designated by the interface 1 is X, a word number s in a page of the flash memory, number t of the flash memory, number u of a physical block of each flash memory, and page number v in the physical block are uniquely determined. And, the ECC parity generated by the ECC generator 2 is written to each page of a physical block of the flash memory 5e.

Figure 6:
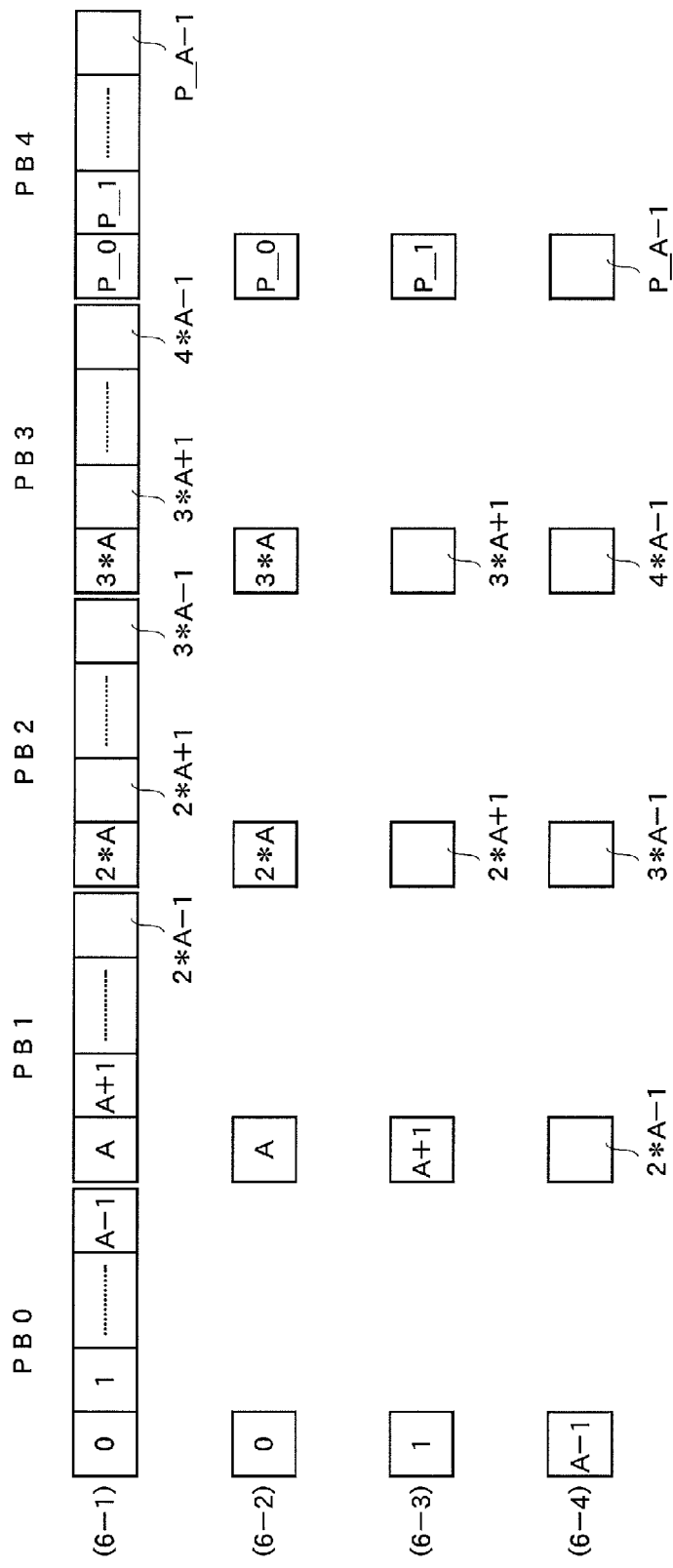
FIG. 6 is an explanation view of creation of the parity according to the present embodiment.

FIG. 6 shows a generation method of the ECC parity. FIG. 6 (6-1) shows assignment of words of pages 0 of the respective physical blocks PB0, PB1, PB2, PB3, and PB4. FIG. 6(6-2) is an association diagram with the ECC parity of a first word of each page, FIG. 6(6-3) is an association diagram with the ECC parity of a second word of each page, and FIG. 6(6-4) is an association diagram with the ECC parity of a last word of each page. The ECC generator 2 calculates P_0, P_1, and P_A−1 as follows.

$$P\_0 = D[0] \text{ XOR } D[A] \text{ XOR } D[2*A] \text{ XOR } D[3*A] \quad (1)$$

$$P\_1 = D[1] \text{ XOR } D[A+1] \text{ XOR } D[2*A+1] \text{ XOR } D[3*A+1] \quad (2)$$

$$P\_A-1 = D[A-1] \text{ XOR } D[2*A-1] \text{ XOR } D[3*A-1] \text{ XOR } D[4*A-1] \quad (3)$$

Here, D[i] shows a value of data corresponding to address i, XOR shows the exclusive OR. Other ECC parities are also calculated in the same manner as those of expressions (1) to (3).

As described above, using plural pieces of data as elements respectively, the ECC parity is generated from the plural pieces of data, the plural pieces of data is recorded to different physical blocks, PB0 to PB3 here, respectively, and the ECC parity is recorded to PB4. The data and ECC parity configure the ECC code. The data and ECC parity are referred to as elements of the ECC code.

In this manner, if an error occurred in the writing to one physical block of them, the data can be recovered on the basis of other elements of the ECC code. For example, in FIG. 6(6-1), in a case where the first data D[0] of the physical block PB0 is recovered, the error data can be recovered from the elements retained in four physical blocks PB1, PB2, PB3, and PB4 on the basis of the following expression (4) obtained by modifying the expression (1).

$$D[0]=D[A] \text{ XOR } D[2^*A] \text{ XOR } D[3^*A] \text{ XOR } P\_0 \qquad (4)$$

The data distributor 3 inputs the data distributed to the respective flash memories to the data writers 4a to 4e, respectively. The data writers 4a to 4e write the distributed data to the respective pages of physical blocks of the flash memories 5a to 5d, and write the ECC parity to the flash memory 5e. In the writing to the flash memory, when the Vth does not reach a desired electric potential within a predetermined time, it is determined as a cell error. In the case where the writing error has occurred, the physical block in which the writing error has occurred is not used henceforth to carry out the writing to other physical blocks again. Accordingly, a process for registering the physical block in which the error has occurred as a bad block and extracting a new physical block to carry out the writing again is required.

Figure 7:
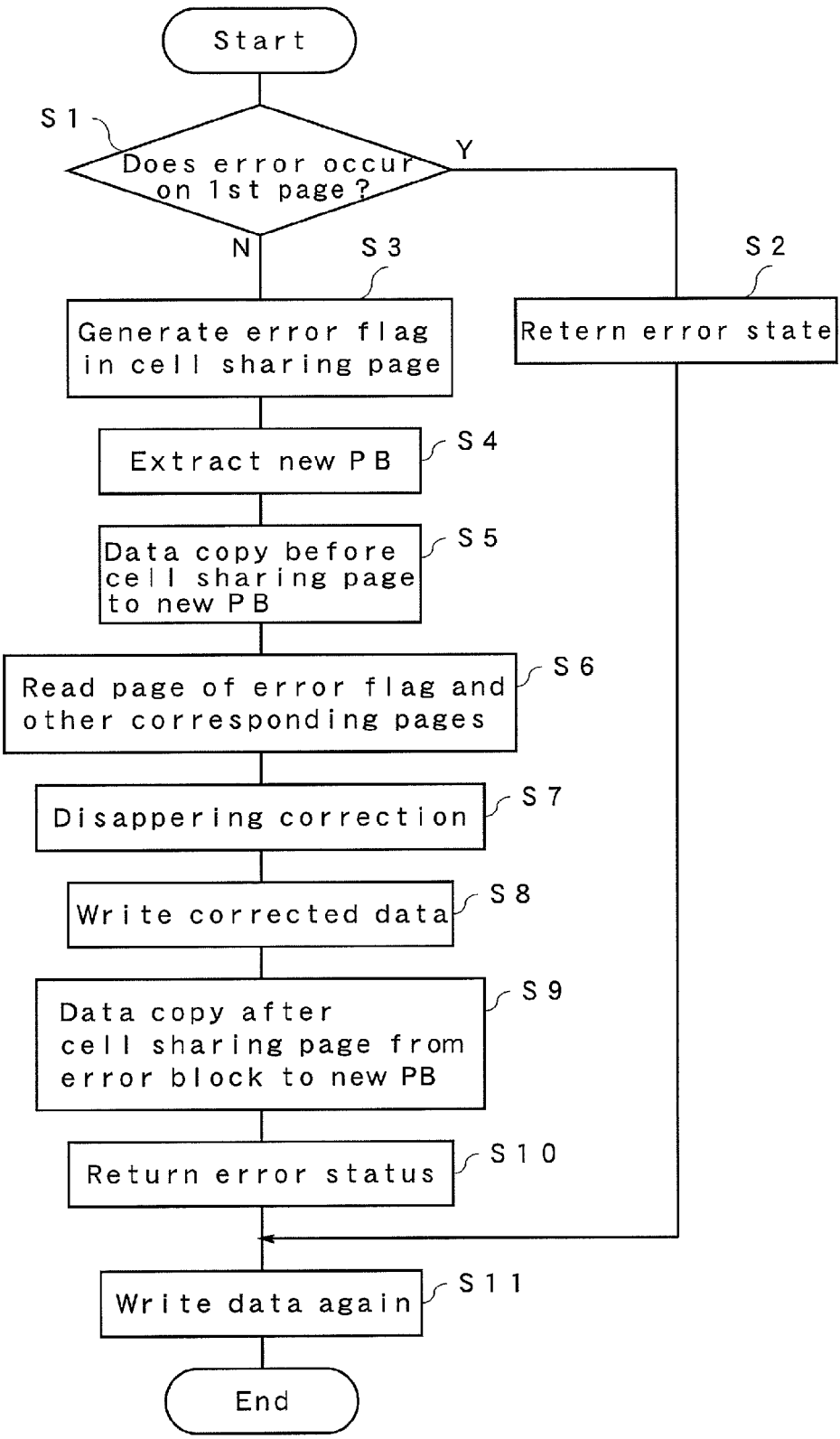
FIG. 7 is a flowchart of a case where a writing error has occurred according to the present embodiment.

Next, referring to a flowchart of FIG. 7, a process after the occurrence of the writing error will be explained. Since the four-valued flash memory is used in the present embodiment, two pages, the first page and the second page, share the respective memory cells. For this reason, as described above, when an error has occurred in the writing to the second page, the error may propagate to the first page sharing the cell of the memory. Accordingly, in the present embodiment, the writing error detectors 6a to 6e detect whether the writing error occurred in the writing or not. When the error has occurred, the writing error detectors 6a to 6e give a page in which the error has occurred to the error flag generator 7. Since knowing the cell sharing information of the flash memory, the error flag detector 7 judges at step S1 whether the page in which the writing error has occurred is the first page or the second page. In the case of the error of the first page, proceeding to step S2, an error state is returned to the host apparatus, and the writing is carried out again on the host apparatus side to finish. In this case, the error flag is not required.

Meanwhile, in the case where it is determined at step S1 that the error is in the second page, the error flag generator 7 generates the error flag in a cell sharing page (step S3). Next, the data recovering part 9 acquires a new physical block at step S4, and copies the data before the cell sharing page from the error occurrence block to the new physical block (step S5). The data recovering part 9 reads the page in which the error flag is valid and the pages of other physical blocks configuring the ECC code via the data readers 8a to 8e (step S6). The data recovering part 9 carries out the disappearing correction on the data read by the data readers 8a to 8e by using the error flag at step S7. Next, the data recovering part 9 writes the data to which the disappearing correction is carried out to the new physical block via any one of the data distributor 3 and the data writers 4a to 4e (step S8). Moreover, the data recovering part 9 copies the data after the cell sharing page from the error occurrence block to the new physical block (step S9), and returns the error status to the host apparatus after that (step S10). In this manner, the host apparatus can write the data of the page in which the writing error has occurred again (step S11).

Figure 8:
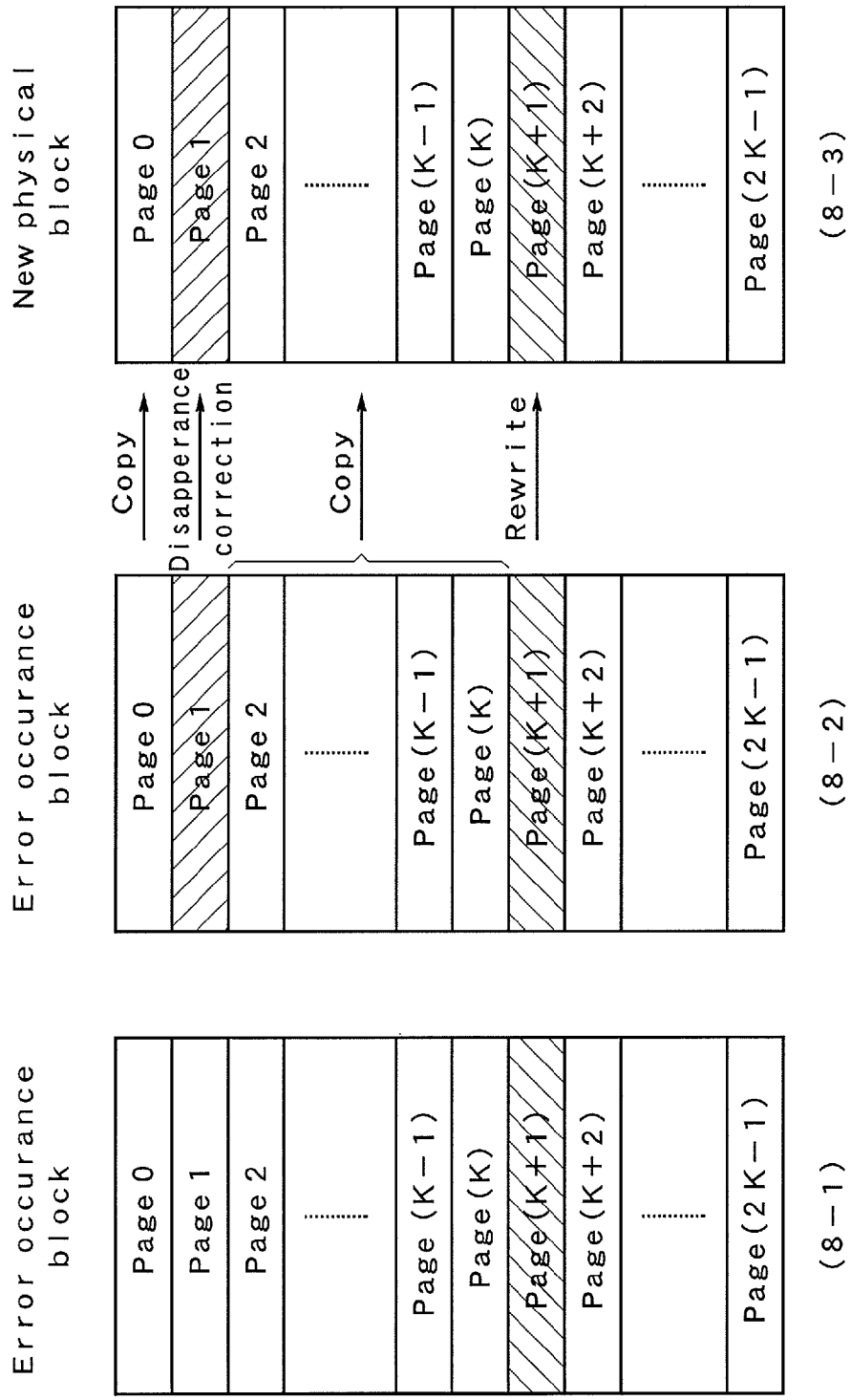
FIG. 8 is a conceptual diagram showing a process of a case where a writing error has occurred according to the present embodiment.

Referring to FIG. 8, the above-mentioned process after step S2 will be explained concretely. In FIG. 8(8-1) shows that the writing error occurred in the writing of data to the hatched page (K+1) of a certain physical block. The page of page number (K+1) is one of the second pages of the memory cells, the memory cells retain the data of the respective bits is in a relation of the cell sharing with the memory cell retaining the respective pieces of bit data of page number 1. FIGS. 8(8-2) and (8-3) are explanation views for the recovering of the error occurrence physical block, (8-2) is the physical block in which the error occurred, and (8-3) is the new physical block used for recovering and newly writing the data. In this case, the process will be carried out along the following steps.

(Step S3) the data recovering part 9 generates the error flag in page 1 of the cell sharing page.
(Step S4) the data recovering part 9 acquires a new physical block.
(Step S5) the data recovering part 9 copies page 0 from the error occurrence block to page 0 of the new physical block.
(Step S6) the data recovering part 9 reads the pages 1 of other physical blocks using the page 1 as elements of the ECC code via the data readers 8a to 8e.
(Step S7) the data recovering part 9 carries out the disappearing correction to the data of pages 1 read by the data readers 8a to 8e by using the error flag.
(Step S8) the data of pages 1 to which the disappearing correction was carried out are written to page 1 of the new physical block.
(Step S9) the data after page 2 is copied from the error occurrence block to the new physical block.
(Step S10) the error status is returned to the host apparatus.
(Step S11) the host apparatus writes the data to page (K+1) again.

As explained above, in the case where the writing error occurred in the second page, since there is a possibility that the error propagates to the data of the first page sharing the cell, the disappearing correction is carried out after reading the first page and the data of pages of other four physical blocks configuring the error correction code, and the data is written again after the recovering. In this manner, the error propagation based on the cell sharing can be prevented.

Modified Example

Figure 9:
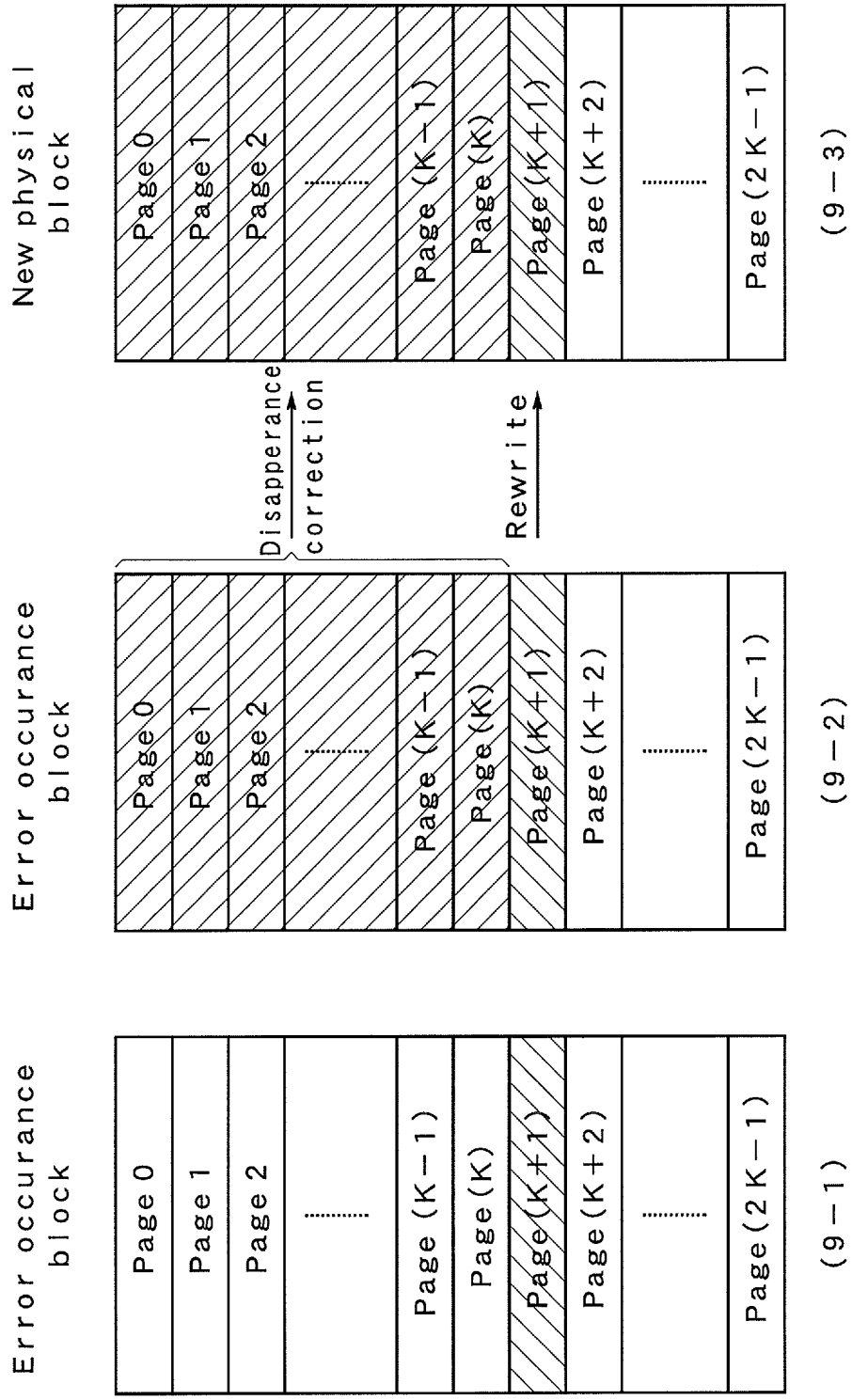
FIG. 9 is a conceptual diagram showing a process of the case where a writing error has occurred according to a modified example (a case where there is no cell sharing information) of the present embodiment.

Next, a modified example of the present embodiment will be explained. This modified example is a case where the information of the cell sharing in a physical block is not disclosed. Accordingly, in this modified example, the ECC generator generates the ECC parities of all pages. Referring to FIG. 9, a process of this case will be explained. In (9-1) of FIG. 9 shows that a writing error occurred in the writing of page (K+1). It is not known whether page (K+1) is the first page or the second page and that the page is in the relation of cell sharing with which page. However, if the second page, the first page being in the relation of cell sharing with page (K+1) is included in page 0 to page K before it. FIGS. 9(9-2) and (9-3) are explanation views in the case of recovering the error occurrence block, FIG. 9(9-2) is a physical block in which the error occurred, and FIG. 9(9-3) is a new physical block after recovering the data. In the process of this case, the error flag generator 7 validates all error flags of page 0 to page K that are pages before the occurrence of error. Then, the data recovering part 9 reads the data of written pages and the respective elements of the ECC code of other physical blocks configuring the error correction code in sequence, the disappearing correction is carried out to the data of page 0 to page K in sequence, and the data are written to the new physical block. In the same manner as that of FIG. 8, the page (K+1) in which the error occurred returns the error status to the host apparatus, and the host apparatus carries out the writing again.

As described above, also in the case where the information of cell sharing in a physical block is not disclosed, all written pages of a physical block in which the writing error occurred is processed as being error. That is, the data of written pages of the physical block in which the writing error occurred and the data of other physical blocks configuring the error correction code are read in subsequently, the writing is carried out to the new physical block again carrying out the disappearing correction, and thereby being able to recover all data in units of physical block.

In this case, since the data of a physical block to which an error propagates can be recovered by reading the data of other physical blocks and by carrying out the disappearing correction, it is not required to mount a large capacity buffer memory on the semiconductor recording device and the host apparatus.

Moreover, in the same reason as the above-mentioned reason, it is not required to limit a data size written by the host apparatus to an integral multiple of the physical block.

In the above-mentioned explanation, the recovering of the writing error has been explained; however, in the present embodiment, the recovering may be used for error correction in the reading. Especially in the semiconductor recording device using the multi-level flash memory, since a disturb characteristic giving a bad influence to an adjoining memory cell in the reading and a retention characteristics retaining the data are deteriorate in comparison with a binary flash memory, the recovering works effectively.

Embodiment 2

Figure 10:
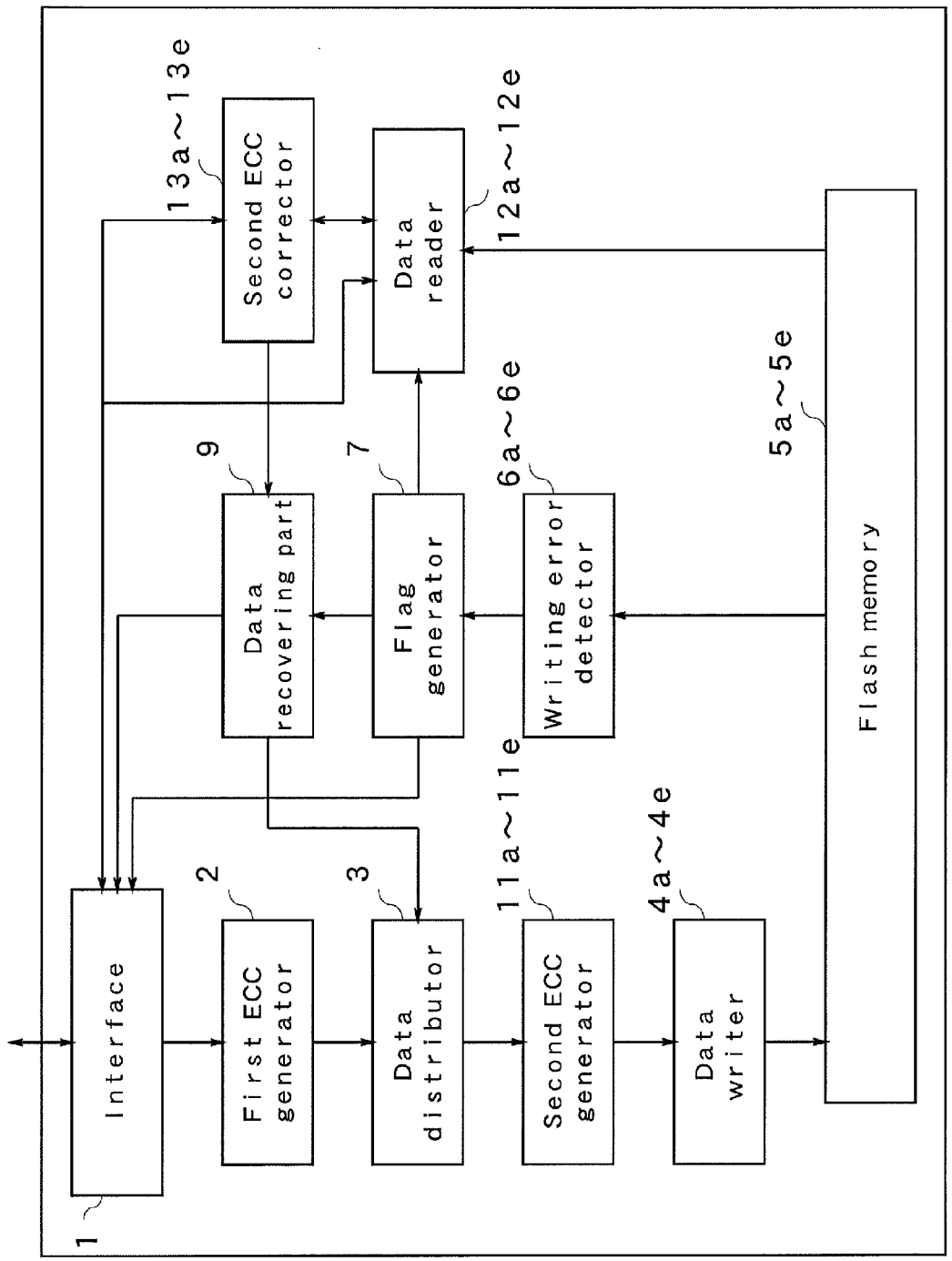
FIG. 10 is a configuration view of a semiconductor recording device according to embodiment 2 of the present invention.

Next, using FIG. 10, a semiconductor recording device according to embodiment 2 of the present invention will be explained. The present embodiment improves an error resistance in the reading in addition to an error correction in the writing. In FIG. 10, an output of the data distributor 3 is given to the second ECC generators 11a to 11e. The second ECC generators 11a to 11e generates the ECC parity to the distributed data, and sets the ECC parity and data, that is, the ECC code in units of page. The output of the ECC is directly given to the data writers 4a to 4e. In addition, outputs of the data readers 12a to 12e are given to the data recovering part 9 via second ECC correctors 13a to 13e. When an error occurred and the error is correctable, the second ECC correctors 13a to 13e give the data after the correction based on the ECC parity in units of page generated by the second ECC generators 11a to 11e. The data readers 12a to 12e read the data related to an address included in a reading command when receiving the reading command, and reads all data of a first ECC code using data of pages to which a reading error flag is given as configuration elements from the respective physical blocks of the nonvolatile memory. Other configurations are the same as those of embodiment 1, and accordingly their explanations will be omitted.

Figure 11A:
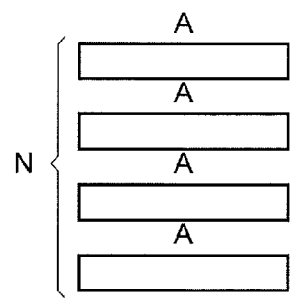
FIG. 11A is a diagram view showing an example of writing data.

Next, using FIG. 11, a writing operation of the semiconductor recording device according to the embodiment will be explained. When receiving a write command from the host apparatus, the first ECC generator 2 adds the ECC parity of M words (M is a natural number) to N words extracted at intervals of A words in the inputted data of (A*N) words (A and N are natural numbers) to generate A number of the first ECC codes of (N+M) words as shown in FIG. 11A.

Figure 11B:
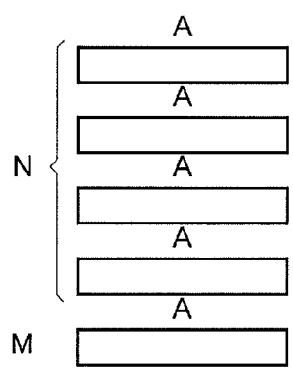
FIG. 11B is a diagram showing a state where an ECC code is added to the writing data in a first ECC generator.
Figure 11C:
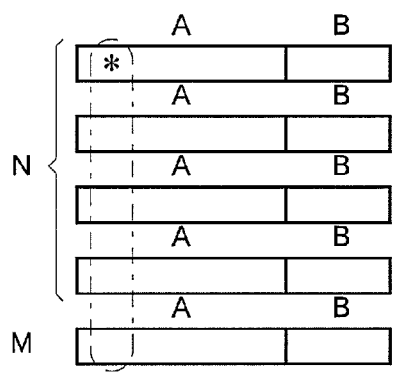
FIG. 11C is a diagram showing a state where an ECC code is added by a second ECC generator.

The data distributor 3 distributes (N+M) words of the ECC code generated by the ECC generator 2, five words here, to the second ECC generators 11a to 11e in each one word to distribute the code to (N+M) physical blocks by A words by repeating this process as shown in FIG. 11B.

The second ECC generators 11a to 11e generate the ECC code in units of page. In the embodiment, the word number of each page is A+B words. The second ECC generators 11a to 11e add the ECC parity of B words (B is an integer of 2 or more) to the A words. As the method of ECC, the Reed-Solomon code, for example, is used. The explanation of the Reed-Solomon code is omitted but has ability to correct an error of B/2 words. Meanwhile, as described above, the first ECC generator 2 generates the ECC parity from N pieces of data configuring a group. Accordingly, it has to be focused that the first ECC code and the second ECC code are in an orthogonal relation. That is, the second ECC code of (A+B) words is distributed to a certain physical block, one element of them is shown as * in FIG. 11C. The element is one word of the first ECC code shown by a dashed line. Accordingly, even in a case where an error occurred in an element and thus the error could not be corrected by the second ECC code, the error is an error of one word when observed by the first ECC code and accordingly can be corrected sufficiently.

The data to which the ECC parity is added is inputted to the data writers 4a to 4e, and is written to the flash memories 5a to 5e. The error correction in the writing may be carried out in the same manner as that of embodiment 1. That is, in the case where the information of cell sharing is already known as shown in FIG. 8, if an writing error occurs, the disappearing correction is carried out to a page having a possibility of error propagation based on the cell sharing, and other pages are copied to a physical block. Or, when the information of cell sharing is not disclosed as in FIG. 9, there is a method for carrying out the disappearing correction to all written pages before the error occurrence page to write the pages to a new physical block. Moreover, in addition to this, a method using the second ECC code will be explained below. The ECC correction parts 13a to 13e in this case further have a function for outputting a reading error flag if the correction is impossible.

In the case where an error occurred in the writing, all data of the corresponding physical block of a flash memory in which the writing error occurred are read from the data reader (at least one of 12a to 12e). All the data of the corresponding physical block read from the flash memory are inputted to the second ECC corrector (at least one of 13a to 13e) in units of page. The second ECC correctors 13a to 13e carry out the error correction if an error occurs in units of the respective pages. In a case where the error correction is impossible, the reading error flag showing that the error correction of the corresponding page was impossible is outputted in units of page. The data recovering part 9 carries out the disappearing correction in accordance with the reading error flag outputted from the second ECC correctors 13a to 13e and the data in which the error is corrected. For example, in a case where it is determined that the error correction of page 1 of the physical block PB0 of the flash memory 5a is impossible, the data readers 12a to 12e read data of pages 1 of other physical blocks in the same group in which the ECC code using the data of this page as configuration elements is recorded. In a case where these pages are read without an error or where if an error exists, the error can be corrected by the second ECC correctors 13a to 13e, data of the respective pages are obtained after the correction. In this manner, the disappearing correction can be carried out to the error of page 1 of the physical block PB0 on the basis of expression (2). The data to which the disappearing correction was carried out by the data recovering part 9 is inputted to the second ECC generator again, and is written to a new physical block of the flash memory by the data writer after generation the second ECC code.

An operation in a case of reading the data from the flash memories 5a to 5e written in this manner will be explained below. The data read from the flash memories 5a to 5e by the data readers 12a to 12e are firstly inputted to the second ECC correctors 13a to 13e. In the second ECC correctors 13a to 13e, the error correction is carried out when there is an error in units of the respective pages. In the case where the error correction is impossible, the reading error flag showing that the error correction of the corresponding page was impossible is outputted in units of page. In the data recovering part 9, the disappearing correction is carried out in accordance with the reading error flag outputted from the second ECC correctors 13a to 13e and the data in which the error is corrected. For example, in a case where it is determined that the error correction of page 1 of the physical block PB0 of the flash memory 5a is impossible, the data readers 12a to 12e read data of pages 1 of other physical blocks in the same group in which the ECC code using the data of this page as configuration elements is recorded. In a case where these pages are read without an error or where if an error exists, the error can be corrected by the second ECC correctors 13a to 13e, the disappearing correction can be carried out on the basis of expression (2). The data to which the disappearing correction was carried out by the data recovering part 9 is outputted to the host apparatus via the interface 1.

As described above, the parity is added to N words extracted at intervals of A words in the data (A*N) words inputted via the interface (A and N are natural numbers) to configure the error correction code of (N+M) words, the data distributor distributes the (N+M) words to the different second ECC generators by A words respectively, and (A+B) words in which a parity code of B words is added to the A words by the second ECC generator is recorded in the respective pages.

In the case where an error occurred in the writing, a page being in the relation of cell sharing with error occurrence page can be detected by reading all data of the physical block in which the error occurred in units of page and detecting a page whose error cannot be corrected by the second error corrector. Then, the influence of error propagation to the cell sharing part caused in the writing error can be prevented by recovering in the data recovering part the data of A words of the page whose error could not be corrected from the data of N+M−1 pages of other physical blocks and carrying out the writing again.

Meanwhile, in the reading of data, (A+B) words are read in units of page from the flash memory, A words in which the error has been corrected is outputted in a case where the error can be corrected by the second ECC corrector, and an error flag is outputted in the case where the error cannot be corrected. On this occasion, the data of A words of the page in which the error could not be corrected in the data of N+M−1 pages of other physical blocks is recovered by the data recovering part, and the data is outputted to the host apparatus via the interface.

The flash memory often records data by using the second ECC code in a page, and prescribes the number of rewritings and a preservation period depending on the characteristics of memory cell and a correction ability of the second ECC code. Accordingly, the error correction ability can be improved by adding the first ECC code to the outside of the second ECC code as in the present embodiment, and the use exceeding the prescribed performance becomes possible.

Meanwhile, the semiconductor recording device in which the data is preliminarily written and that a user is able to only read as shown here can be used as the semiconductor recording device for carrying out the error correction when reading by using the data readers 12a to 12e, the second ECC correctors 13a to 13e, and the data recovering part 9.

In addition, to simplify the above-mentioned explanation, the first ECC code is one parity; however, it is needless to say that a parity more than one may be added. That is, the number M of the parity may be an arbitrary natural number of one or more. In addition, the data readers 12a to 12e read the data related to an address included in a reading command when receiving the reading command, then simultaneously all data of the first ECC code using data of the page as the configuration element preliminarily are read from the respective physical blocks of the nonvolatile memory, and thereby the process of disappearing correction of the error can be accelerated.

In addition, the second ECC correction code is configured in units of page; however, it is needless to say that the plurality of ECC codes (for example, four ECC codes in units of 512 words with respect to 2048 words) may be configured in one page.

Moreover, in the respective embodiments, the multi-level flash memory where the bit number stored in one memory cell is two bits is used; however, it is needless to say that the present invention can be applied to a multi-level flash memory able to store three bits or more in one cell, increasing the state.

Additionally, in the respective embodiments, the respective elements of the first ECC code are stored in the respective flash memories by using five flash memories; however, the elements may be recorded in different physical blocks of the flash memory.

Furthermore, when applied to not only the flash memory but also to other nonvolatile memories, it is needless to say that the same effect can be obtained.

INDUSTRIAL APPLICABILITY

The semiconductor recording device of the present invention relates to a semiconductor recording device such as a memory card, and is able to recover a writing error and reading error occurred especially in an internal nonvolatile memory and to improve ability of error resistance of a multi-level flash memory, thereby has a great possibility of being used in a professional field requiring reliability.

The invention claimed is:

1. A semiconductor recording device incorporating a multi-level nonvolatile memory storing a plurality of bits per memory cell and having physical blocks composed of a plurality of pages, wherein a plurality of said physical blocks are configured as one group, comprising:
 a first error correcting code (ECC) generator for adding an ECC parity extracted at a predetermined interval in inputted data and for generating a first ECC;

a data distributor for distributing the first ECC generated by said first ECC generator to different physical blocks in the group in a predetermined size;

a data writer for writing data distributed by said data distributor to the respective physical blocks of a group;

a writing error detector for detecting, when writing to said nonvolatile memory in a page of the physical block, a writing error;

an error flag generator for generating an error flag showing a possibility of the writing error with respect to a page of a cell that stores a plurality of bits, wherein respective bits of a page in which an error is detected by said writing error detector share a common cell of said nonvolatile memory;

a data reader for reading data of a page in which the error flag is generated by said error flag generator and all data configuring the first ECC from the respective physical blocks; and a data recovering part for recovering data of a cell sharing page specified by said error flag generator from the data read by said data reader and writing the recovered data to a page of a physical block in which data is not previously written.

2. The semiconductor recording device according to claim 1, wherein said error flag generator generates an error flag showing possibility of a writing error with respect to all written pages of the physical block to which a page where an error is detected by said writing error detector belongs.

3. The semiconductor recording device according to claim 1, wherein said data writer writes data distributed by said data distributor to same pages of the respective physical blocks.

4. The semiconductor recording device according to claim 1, wherein each physical block of the plurality of physical blocks are different nonvolatile memories, respectively.

* * * * *